(12) United States Patent
Rouverand et al.

(10) Patent No.: US 6,919,709 B2
(45) Date of Patent: Jul. 19, 2005

(54) BATTERY CHARGER

(75) Inventors: Christophe Rouverand, Saint Germain en Laye (FR); Vincent Lomba, Houilles (FR)

(73) Assignee: Alcatel, Paris (FR)

( * ) Notice: Subject to any disclaimer, the term of this patent is extended or adjusted under 35 U.S.C. 154(b) by 200 days.

(21) Appl. No.: 10/614,797

(22) Filed: Jul. 9, 2003

(65) Prior Publication Data

US 2004/0012372 A1 Jan. 22, 2004

(30) Foreign Application Priority Data

Jul. 18, 2002 (FR) .......................................... 02 09135

(51) Int. Cl.$^7$ ........................ H01M 10/44; H01M 10/46
(52) U.S. Cl. .................................................... 320/128
(58) Field of Search ................................ 320/128, 137, 320/140; 323/220, 299

(56) References Cited

U.S. PATENT DOCUMENTS 5,146,395 A * 9/1992 McKie ........................ 363/13
5,270,636 A * 12/1993 Lafferty ..................... 320/101
5,982,151 A * 11/1999 Nagai et al. ................ 320/141
5,994,875 A   11/1999 Lee

FOREIGN PATENT DOCUMENTS

EP          0 856 931 A2    8/1998

* cited by examiner

*Primary Examiner*—Edward H. Tso
(74) *Attorney, Agent, or Firm*—Sughrue Mion, PLLC

(57) ABSTRACT

A battery charger has a particularly advantageous application in the field of mobile radio terminal batteries. The charger generates an output voltage and an output current for charging a battery and includes a first regulator, a second regulator for regulating the output voltage to a predetermined value, a detector for detecting the output current, and an activation system which assumes at least two states. In a first state it activates the first regulator when the detector detects a negative or positive output current, and in a second state it activates the second regulator when the detector means detect a substantially zero output current.

37 Claims, 3 Drawing Sheets

BATTERY CHARGER

CROSS-REFERENCE TO RELATED APPLICATIONS

This application is based on French Patent Application No. 02 09 135 filed Jul. 18, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a battery charger and has a particularly advantageous application in the field of batteries for mobile radio terminals.

2. Description of the Prior Art

FIG. 1 shows a conventional mobile radio terminal charger device as used in the prior art. The charger device 11 comprises a charger 8 with two input terminals connected to the AC mains 12. Two output terminals of the charger 8 are connected to the battery 6 via a charging switch 13. The charger device 11 also includes a charging control integrated circuit 14 connected to the battery 6 and connected to a sensor 10 for sensing the temperature of the battery 6 by a connection 16. The charging control circuit 14 also receives information corresponding to the battery voltage via the connection 15. The control circuit 14 controls opening and closing of the charging switch 13 to start and stop charging of the battery 6. The control circuit 14 is also connected to the charger 8 to detect the presence of the charger 8. The presence of the charger is detected by measuring the output voltage of the charger via the connection 17. The control circuit 14, the detector 10 and the switch 13 are inside the mobile radio terminal. The charger 8 has a two-fold function of rectification, filtering and regulation to obtain from the AC mains 12 the appropriate current and voltage for charging the battery 6.

On the basis of information obtained via the connections 15 and 16, the control circuit 14 starts and stops charging of the battery 6 by closing or opening the charging switch 13. For a lithium ion battery the control circuit 14 uses information on the battery voltage whereas for an NiMH battery it uses information on the battery temperature. In all cases, the circuit 14 receives information from the charger 8 corresponding to the charger output voltage and enabling it to detect that the charger is present. This voltage may be relatively high when the switch 13 is open since the battery is no longer charging; it can reach values from around 10 volts to around 20 volts. Some components used in integrated circuits, such as CMOS components, cannot withstand such voltages.

One solution is to use in the charging control circuit BICMOS bipolar components able to withstand higher voltages.

However, this solution gives rise to problems since BICMOS components are much more costly than CMOS components. Moreover, the CMOS technology is much more widespread and standardized than the BICMOS technology.

Furthermore, it is increasingly difficult to distinguish between charger designs, in particular pirated designs. It is important to be able to determine the authenticity of a charger, in particular for reasons of safety and utilization standards.

One solution consists in measuring the off-load voltage of a charger and considering that it is not pirated if the voltage is within a predetermined fixed range.

However, this leads a relatively wide margin of error in that all chargers have fairly similar off-load voltages.

The present invention seeks to provide a battery charger allowing, firstly, the use in the charging control circuit of components such as CMOS components able to withstand only low voltages and, secondly, effective determination of its authenticity.

SUMMARY OF THE INVENTION

To this end, the present invention proposes a charger adapted to generate an output voltage and an output current for charging a battery, the charger including:

a first regulator, a second regulator for regulating the output voltage to a predetermined value, detector means for detecting the output current, and activation means adapted to take at least two states:

a first state for activating the first regulator when the detector means detect a negative or positive output current, and a second state for activating the second regulator when the detector means detect a substantially zero output current.

Thanks to the invention, when the battery is not charging, the output voltage of the charger is limited to the predetermined voltage regulated by the second regulator. This predetermined value can therefore be fixed at a lower value than the usual output voltage of the charger when the battery is charging. The first regulator delivers a voltage or a current needed to charge the battery. The first regulator is activated only when the battery is actually being charged. During charging, the charger output voltage is therefore slightly lower than the battery voltage. Accordingly, the components of the circuit controlling charging of the battery have to withstand at most the battery voltage; these components never have to withstand a voltage that corresponds to the off-load output voltage of the charger when the first regulator is activated, which could be harmful.

Very often, the battery voltage, even when discharged, is higher than the predetermined regulation voltage, which causes a negative current to flow in the charger when the battery is charging. In this case, the detector means detect the negative current and the activation means switch the charger to the first regulator in the charging configuration.

Finally, simply measuring the off-load output voltage of the charger gives a very precise indication as to the authenticity of the charger. The regulated output voltage being very much lower than the off-load output voltages usually used for battery charging, it becomes a very simple matter to know whether the charger is an authentic charger or not. Moreover, protection circuits are provided in the terminal or in the battery in order to prevent the excessively high currents typical of pirated chargers. The invention also dispenses with these protection circuits.

The first regulator is advantageously a power or current regulator.

Thus the output voltage is fixed by the voltage of the battery being charged. It is also possible to use a voltage regulator but this imposes the use of a regulated voltage higher than the battery voltage.

In one embodiment, the activation means include a switch and control means for controlling the switch and connected to the output of the detector means.

The detector means advantageously include at least one first comparator such as a differential amplifier and a detector resistor, and each terminal of the resistor is connected to a respective input of said first differential amplifier.

In one advantageous embodiment the detector means include a second comparator, such as a differential amplifier, a non-inverting input of the second differential amplifier is connected to an inverting input of the first differential amplifier, and an inverting input of the second differential amplifier is connected to a non-inverting input of the first differential amplifier.

The charger advantageously includes charging means, such as a resistor or a transistor, so that a negative current can flow through the charging means.

The charger advantageously takes the form of a mobile radio terminal battery charger.

The present invention also provides a method of charging a battery by means of a charger generating an output voltage and an output current, the method including a regulation step and further including the following steps:

detection of the output current, regulation by means of a first regulator when the output current is negative or positive, regulation of the output voltage to a predetermined value by means of a second regulator when the output current is substantially zero.

The predetermined value of the output voltage is advantageously less than the output voltage of the charger when the battery is charging.

Finally, the invention provides a method of identifying a charger according to the invention, which method includes a step of measuring an off-load output voltage of the charger and a step of comparing the off-load output voltage with the predetermined value fixed by the second regulator.

Other features and advantages of the present invention will become apparent in the course of the following description of one embodiment of the invention, which is given by way of illustrative and nonlimiting example.

DETAILED DESCRIPTION OF THE PREFERRED EMBODIMENT

Components common to more than one figure carry the same reference numbers in all figures in which they appear.

Figure 1:
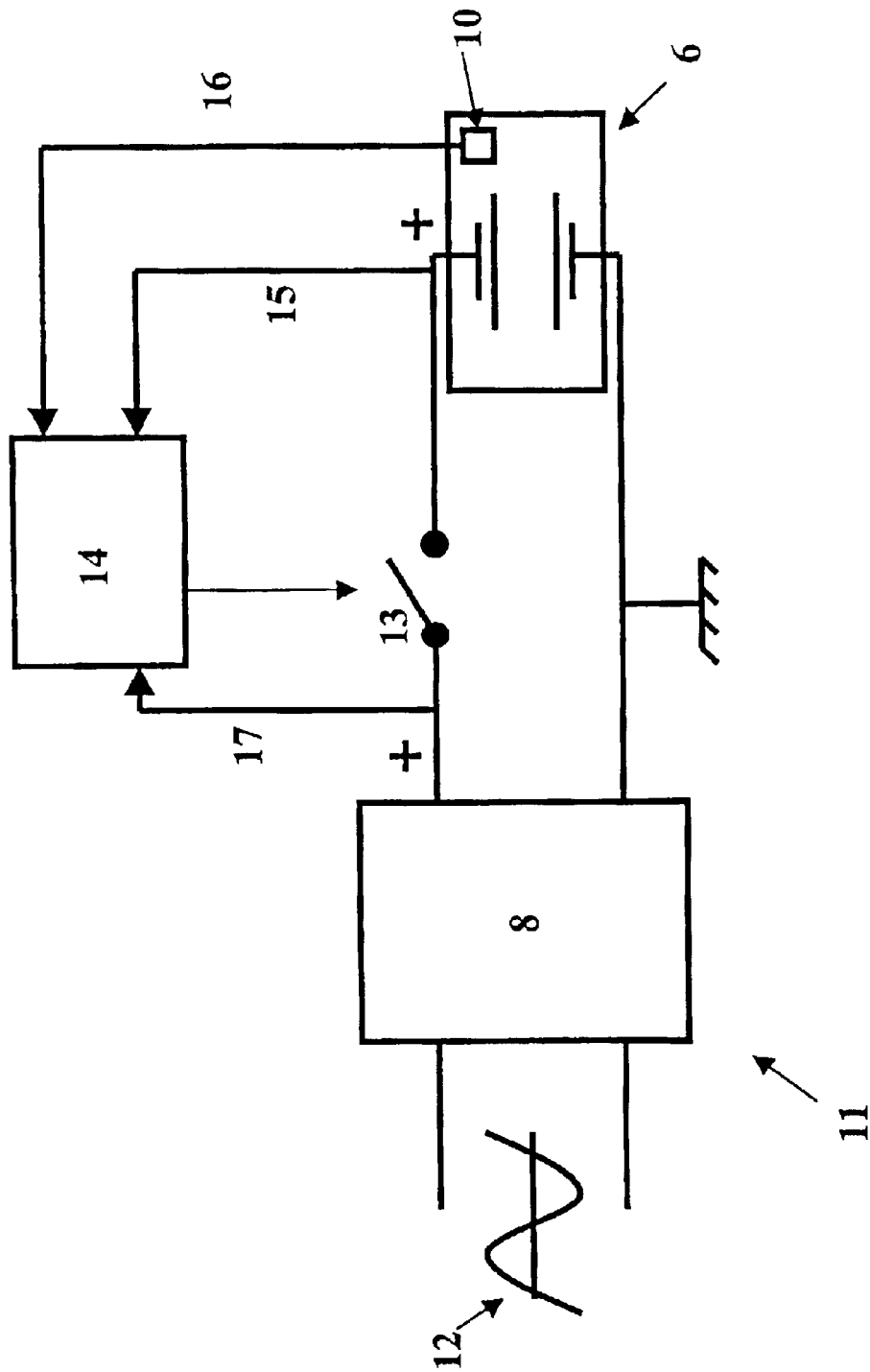
FIG. 1 shows a prior art device for charging a mobile radio terminal.

FIG. 1 has already been described in relation to the prior art.

Figure 2:
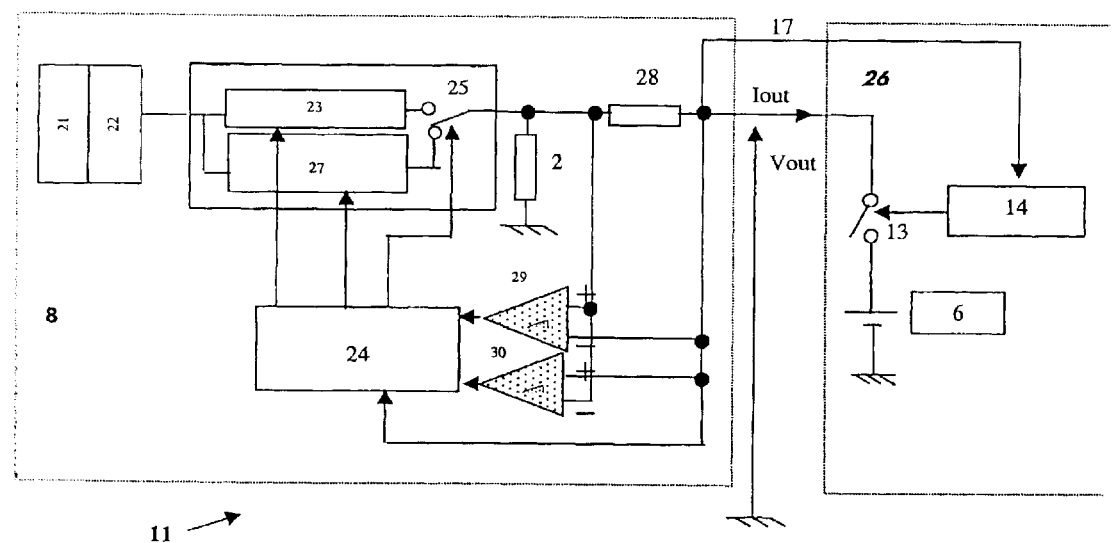
FIG. 2 shows a device for charging a mobile radio terminal including a charger according to the invention.

FIG. 2 shows a charger device 11 including a charger 8 supplying an output voltage $V_{out}$ and an output current $I_{out}$ to a battery of a mobile radio terminal 26.

The terminal 26 includes a battery 6 and a charging control circuit consisting of a microcontroller 14 and a charging switch 13 such as a power MOSFET. The microcontroller 14 controls the switch 13 and detects the presence of a charger by measuring the charger output voltage $V_{out}$ via the connection 17.

The charger 8 includes:

a transformer having a primary winding 21 and a secondary winding 22, a current or power regulator 23, a voltage regulator 27, a switch 25, such as a power MOSFET, a charging resistor 2, a detector resistor 28, two comparators 29 and 30, such as differential amplifiers, and a microcontroller 24.

The regulators 23 and 27 are connected in parallel between the output of the secondary winding 22 and the switch 25 and use techniques known to the person skilled in the art, for example feedback of information from the microcontroller 24.

The switch 25 is controlled by the microcontroller 24.

The switch 25 is connected in series with one terminal of the detector resistor 28. The output voltage $V_{out}$ appears at the other terminal of the detector resistor 28.

Respective terminals of said detector resistor 28 are connected to inverting and non-inverting inputs of the first differential amplifier 29.

A non-inverting input of the second differential amplifier 30 is connected to the inverting input of the first differential amplifier 29 and an inverting input of the second differential amplifier 30 is connected to the non-inverting input of the first differential amplifier 29.

Outputs of the differential amplifiers 29 and 30 are connected to the microcontroller 24.

The charging resistor 2 is in series between the detector resistor 28 and the ground of the charger 8.

Figure 3:
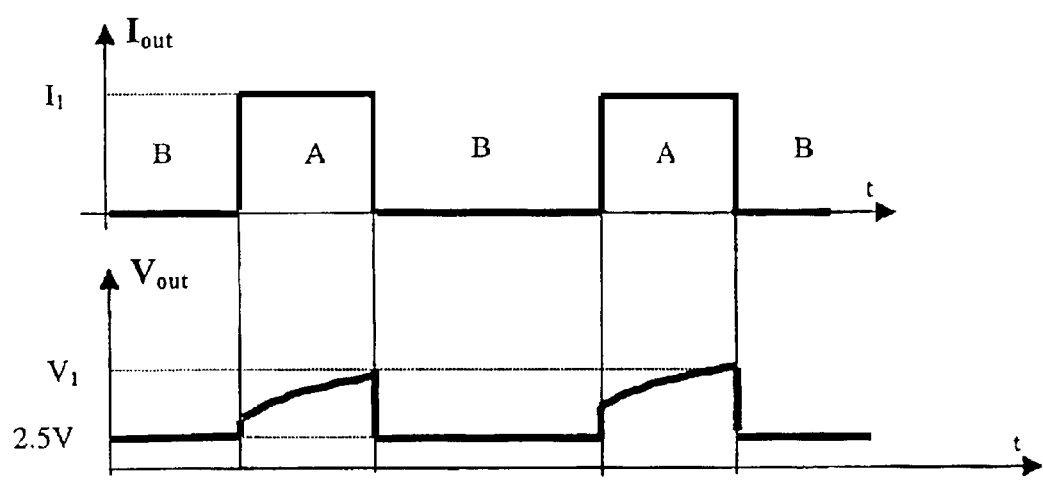
FIG. 3 shows the current and the voltage at the output of the charger as a function of time.

The operation of the charger 8 is described with reference to FIG. 3, which shows the output current $I_{out}$ and the output voltage $V_{out}$ of the charger as a function of time. Consider the example of a lithium ion battery whose charged voltage is approximately 4.2 V and whose discharged voltage is approximately 3 V.

If the charging control microcontroller 14 opens the switch 13, the current $I_{out}$ is zero. This step corresponds to phase B. The voltage at the terminals of the resistor 28 is then zero and the differential amplifiers 29 and 30 both supply a zero output voltage corresponding to a low logic state. The microcontroller 24 activates the voltage regulator 27 which fixes $V_{out}$ at a predetermined voltage of the order of 2.5 V below the output voltage of the charger 8 when the battery is charging.

If the switch 13 is closed, the voltage $V_{out}$ of 2.5 V is less than the battery voltage. The output current Iout becomes negative (this is not shown) and the battery discharges into the resistors 28 and 2. The differential amplifier 30 then supplies a positive output voltage corresponding to a logic 1 state and the microcontroller 24 activates the current regulator 23. The charger is then in the charging configuration and the output current $I_{out}$ takes a constant value $I_1$ from 300 mA to 1 A. This step corresponds to phase A. During phase A, the output voltage $V_{out}$ changes from 2.5 V to a value $V_1$ of the order of 4 V, which is always less than the voltage of the battery because of the voltage drop in the switch 13. The charging resistor 2 must be of sufficiently high value not to influence charging.

At this stage it is the amplifier 29 that supplies a high logic state at the output whereas the output of the amplifier 30 is at a negative voltage corresponding to a low logic state. The microcontroller 24 maintains the activation of the current regulator 23.

If the microcontroller 14 opens the switch 13 again, the current $I_{out}$ becomes zero, and this step corresponds to phase B.

Accordingly, the output voltage $V_{out}$ is always less than the battery voltage and never assumes the off-load voltage of the charger when the current regulator 23 is activated. The logic components of the microcontroller 14 therefore do not have to withstand an excessively high voltage.

Of course, the invention is not limited to the embodiment just described.

In particular, the microcontrollers used can be replaced by analogous means having the same functions.

Similarly, the charging resistor used to receive the negative current when the battery is discharging can be replaced by a variable resistor such as a bipolar transistor operating in the linear regime. This kind of transistor adjusts the resistance as a function of the reverse current without having to assume a very high charging resistance at the outset.

Finally, the charger has been described with comparators consisting of differential amplifiers; the comparators can equally well be produced from analog components, such as transistors.

There is claimed:

1. A charger adapted to generate an output voltage and an output current for charging a battery, said charger including:
   a first regulator,
   a second regulator for regulating said output voltage to a predetermined value,
   detector means for detecting said output current, and
   activation means adapted to take at least two states:
      a first state for activating said first regulator when said detector means detect a negative or positive output current, and
      a second state for activating said second regulator when said detector means detect a substantially zero output current.

2. The charger claimed in claim 1 wherein said first regulator is a power or current regulator.

3. The charger claimed in claim 1 wherein said activation means include a switch and control means for controlling said switch and connected to the output of said detector means.

4. The charger claimed in claim 2 wherein said activation means include a switch and control means for controlling said switch and connected to the output of said detector means.

5. The charger claimed in claim 1 wherein said detector means include at least one comparator.

6. The charger claimed in claim 2 wherein said detector means include at least one comparator.

7. The charger claimed in claim 3 wherein said detector means include at least one comparator.

8. The charger claimed in claim 4 wherein said detector means include at least one comparator.

9. The charger claimed in claim 5 wherein said comparator is a first differential amplifier, said detector means include a detector resistor, and each terminal of said resistor is connected to a respective input of said first differential amplifier.

10. The charger claimed in claim 5 wherein said detector means include a second comparator.

11. The charger claimed in claim 9 wherein said detector means include a second comparator.

12. The charger claimed in claim 10 wherein said second comparator is a second differential amplifier, a non-inverting input of said second differential amplifier is connected to an inverting input of said first differential amplifier, and an inverting input of said second differential amplifier is connected to a non-inverting input of said first differential amplifier.

13. The charger claimed in claim 3 wherein said control means comprise a microcontroller.

14. The charger claimed in claim 5 wherein said control means comprise a microcontroller.

15. The charger claimed in claim 9 wherein said control means comprise a microcontroller.

16. The charger claimed in claim 10 wherein said control means comprise a microcontroller.

17. The charger claimed in claim 12 wherein said control means comprise a microcontroller.

18. The charger claimed in claim 1 including charging means such that a negative current can flow through said charging means.

19. The charger claimed in claim 10 including charging means such that a negative current can flow through said charging means.

20. The charger claimed in claim 11 including charging means such that a negative current can flow through said charging means.

21. The charger claimed in claim 12 including charging means such that a negative current can flow through said charging means.

22. The charger claimed in claim 13 including charging means such that a negative current can flow through said charging means.

23. The charger claimed in claim 14 including charging means such that a negative current can flow through said charging means.

24. The charger claimed in claim 15 including charging means such that a negative current can flow through said charging means.

25. The charger claimed in claim 1 taking the form of a mobile radio terminal battery charger.

26. A method of charging a battery by means of a charger generating an output voltage and an output current, said method including a regulation step and further including the following steps:
   detection of said output current,
   regulation by means of a first regulator where said output current is negative or positive,
   regulation of the output voltage to a predetermined value by means of a second regulator when said output current is substantially zero.

27. The battery charging method claimed in claim 26 wherein said predetermined value of said output voltage is less than the output voltage of said charger when said battery is charging.

28. A method of identifying a charger as claimed in claim 1, which method includes a step of measuring an off-load output voltage of said charger and a step of comparing said off-load output voltage with said predetermined value fixed by said second regulator.

29. A method of identifying a charger as claimed in claim 2, which method includes a step of measuring the off-load output voltage of said charger and a step of comparing said off-load output voltage with said predetermined value fixed by said second regulator.

30. A method of identifying a charger as claimed in claim 3, which method includes a step of measuring the off-load output voltage of said charger and a step of comparing said off-load output voltage with said predetermined value fixed by said second regulator.

31. A method of identifying a charger as claimed in claim 5, which method includes a step of measuring the off-load output voltage of said charger and a step of comparing said off-load output voltage with said predetermined value fixed by said second regulator.

32. A method of identifying a charger as claimed in claim 9, which method includes a step of measuring the off-load output voltage of said charger and a step of comparing said off-load output voltage with said predetermined value fixed by said second regulator.

33. A method of identifying a charger as claimed in claim 10, which method includes a step of measuring the off-load output voltage of said charger and a step of comparing said off-load output voltage with said predetermined value fixed by said second regulator.

34. A method of identifying a charger as claimed in claim 12, which method includes a step of measuring the off-load output voltage of said charger and a step of comparing said off-load output voltage with said predetermined value fixed by said second regulator.

35. A method of identifying a charger as claimed in claim 13, which method includes a step of measuring the off-load output voltage of said charger and a step of comparing said off-load output voltage with said predetermined value fixed by said second regulator.

36. A method of identifying a charger as claimed in claim 18, which method includes a step of measuring the off-load output voltage of said charger and a step of comparing said off-load output voltage with said predetermined value fixed by said second regulator.

37. A method of identifying a charger as claimed in claim 25, which method includes a step of measuring the off-load output voltage of said charger and a step of comparing said off-load output voltage with said predetermined value fixed by said second regulator.

* * * * *